United States Patent
Itoh et al.

(10) Patent No.: US 7,997,737 B2
(45) Date of Patent: Aug. 16, 2011

(54) PROJECTION DISPLAY DEVICE, AND SPECKLE REDUCTION ELEMENT

(75) Inventors: Tatsuo Itoh, Osaka (JP); Tetsuro Mizushima, Osaka (JP); Kazuhisa Yamamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 444 days.

(21) Appl. No.: 12/295,072

(22) PCT Filed: Apr. 5, 2007

(86) PCT No.: PCT/JP2007/057656
§ 371 (c)(1),
(2), (4) Date: Sep. 29, 2008

(87) PCT Pub. No.: WO2007/116935
PCT Pub. Date: Oct. 18, 2007

(65) Prior Publication Data
US 2009/0310087 A1    Dec. 17, 2009

(30) Foreign Application Priority Data
Apr. 12, 2006  (JP) .................... 2006-109492

(51) Int. Cl.
*G03B 21/14* (2006.01)
*G02F 1/29* (2006.01)
(52) U.S. Cl. .................... 353/79; 349/193; 353/122
(58) Field of Classification Search ............ 353/31, 353/38, 94, 33, 34, 37, 79; 349/5, 7, 8, 201, 349/9, 18, 33, 193; 359/316, 15, 22, 24, 359/25, 27, 28, 33
See application file for complete search history.

(56) References Cited

U.S. PATENT DOCUMENTS

| 5,313,479 | A | 5/1994 | Florence |
| 7,399,084 | B2 * | 7/2008 | Morikawa et al. ............... 353/31 |
| 7,585,078 | B2 * | 9/2009 | Kim et al. ........................ 353/82 |
| 7,649,610 | B1 * | 1/2010 | Dultz et al. .................... 349/193 |
| 2009/0190618 | A1 * | 7/2009 | Kuksenkov et al. ............ 372/33 |
| 2010/0118535 | A1 * | 5/2010 | Kusukame et al. ............ 362/259 |

FOREIGN PATENT DOCUMENTS

| JP | 6-208089 | 7/1994 |
| JP | 2002-541526 | 12/2002 |
| JP | 2003-262920 | 9/2003 |
| JP | 2005-309100 | 11/2005 |
| JP | 2005-352020 | 12/2005 |
| WO | 2005/098532 | 10/2005 |

OTHER PUBLICATIONS

International Search Report issued May 1, 2007 in the International (PCT) Application No. PCT/JP2007/057656.

* cited by examiner

*Primary Examiner* — William C Dowling
(74) *Attorney, Agent, or Firm* — Wenderoth Lind & Ponack, L.L.P.

(57) ABSTRACT

A projection display device enhances reliability and reduces speckle noise. A blue laser, a red laser, and a green laser emit blue laser light, red laser light, and green laser light, respectively. A spatial light modulation element modulates the blue laser light emitted from the blue laser, the red laser light emitted from the red laser, and the green laser light emitted from the green laser. A projection lens projects the laser light modulated by the spatial light modulation element onto a screen. First and second light diffusing elements are arranged on an optical axis between the blue laser, the red laser, and the green laser, and the spatial light modulation element to change the degree of diffusion of the blue laser light, the red laser light, and the green laser light temporally and electrically.

14 Claims, 9 Drawing Sheets

PRIOR ART

PROJECTION DISPLAY DEVICE, AND SPECKLE REDUCTION ELEMENT

BACKGROUND OF THE INVENTION

1. Technical Field

The present invention relates to a projection display device using laser light, and a speckle reduction element for reducing speckle noise.

2. Background Art

In recent years, as a high-output blue semiconductor laser has been commercialized, development of a projection display device incorporated with three primary color laser light sources has been progressed by using a red semiconductor laser, a green laser with a second harmonic generation device (hereinafter, abbreviated as "SHG device"), and the blue semiconductor laser. Use of a laser for emitting monochromatic laser light as a light source is advantageous in producing a projection display device with a wide reproducible color range, and a small electric power consumption. In the projection display device incorporated with the above laser light sources, generation of speckle noise has been a drawback. Speckle noise is a random interference pattern resulting from interference of laser light reflected on a screen having fine convex and concave portions in the case where an image is formed on the screen by using laser light having a high interference property. In a conventional projection display device, an interference pattern is changed at a high speed on a screen by mechanically moving a light diffuser to suppress detection of speckle noise by the human eye (see e.g. patent document 1).

FIG. 12 is a diagram showing an arrangement of a conventional projection display device recited in patent document 1. Referring to FIG. 12, laser light emitted from a red laser 101, a blue laser 103, and a green laser 105 is respectively wavelength-selectively reflected on dichroic mirrors 102, 104, and 106, and combined on a common optical axis. The combined laser light is diffused through a light diffusing element 107 made of ground glass or a like material, and thereafter, the diffused light illuminates a spatial light modulation element 110 via a lens 109. Laser light modulated by the spatial light modulation element 110 is projected on a screen 112 by a projection lens 111 as an image. The aforementioned interference pattern is changed at a high speed on the screen 112 by rotating the light diffusing element 107 by a motor 108. Thereby, speckle noise is eliminated.

In the arrangement of the conventional projection display device, since it is required to mechanically move the light diffusing element, an actuator such as the motor 108 is necessary. This may increase the size of the projection display device, or lower reliability of the device by wear of mechanical parts.

Patent document 1: Japanese Unexamined Patent Publication No. Hei 6-208089

SUMMARY OF THE INVENTION

In view of the above conventional drawback, it is an object of the invention to provide a projection display device that enables to reduce the size of the projection display device, enhance reliability of the device, and reduce speckle noise, as well as a speckle reduction element.

A projection display device according to an aspect of the invention includes: a laser light source; a spatial light modulation element for modulating laser light to be emitted from the laser light source; a projection lens for projecting the laser light modulated by the spatial light modulation element onto a screen; and a plurality of light diffusing elements, arranged on an optical axis between the laser light source and the spatial light modulation element, for changing a degree of diffusion of the laser light temporally and electrically.

In the above arrangement, the laser light is emitted from the laser light source. The laser light emitted from the laser light source is modulated by the spatial light modulation element. The laser light modulated by the spatial light modulation element is projected onto the screen by the projection lens. Also, the plurality of the light diffusing elements arranged on the optical axis between the laser light source and the spatial light modulation element are operable to change the degree of diffusion of the laser light temporally and electrically.

In the above arrangement, unlike the conventional art, wherein an actuator is used to mechanically change the degree of diffusion, the degree of diffusion is electrically changed. This enables to miniaturize the projection display device, and enhance reliability of the device. Further, since the degree of diffusion of the laser light is temporally changed, speckle noise can be reduced.

A speckle reduction element according to another aspect of the invention includes: a plurality of light diffusing elements arranged on an optical axis between a laser light source for emitting laser light, and a spatial light modulation element for modulating the laser light to be emitted from the laser light source; and a driver for applying a cyclically variable voltage to the plurality of the light diffusing elements to change a degree of diffusion of the laser light temporally and electrically.

In the above arrangement, the plurality of the light diffusing elements are arranged on the optical axis between the laser light source for emitting laser light, and the spatial light modulation element for modulating the laser light to be emitted from the laser light source. The driver is operable to apply the cyclically variable voltage to the plurality of the light diffusing elements to change the degree of diffusion of the laser light temporally and electrically.

In the above arrangement, unlike the conventional art, wherein an actuator is used to mechanically change the degree of diffusion, the degree of diffusion is electrically changed. This enables to miniaturize the projection display device, and enhance reliability of the device. Further, since the degree of diffusion of the laser light is temporally changed, speckle noise can be reduced.

DETAILED DESCRIPTION OF THE INVENTION

Figure 1:
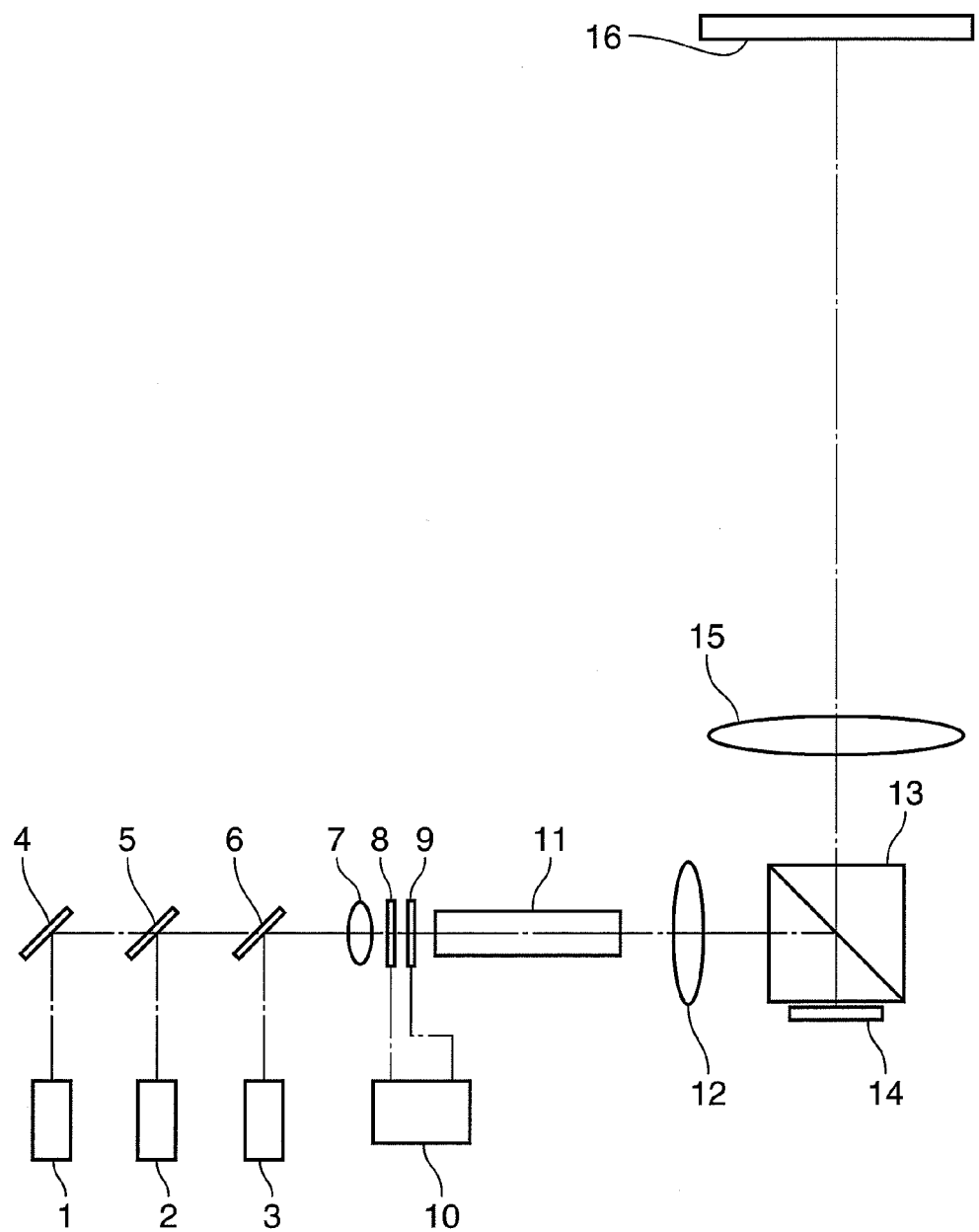
FIG. 1 is a diagram showing an arrangement of a projection display device in accordance with a first embodiment of the invention.

In the following, embodiments of the invention are described referring to the drawings. The invention may be modified and implemented according to needs, as far as a primary feature of the invention is not changed.

FIRST EMBODIMENT

FIG. 1 is a diagram showing an arrangement of a projection display device in accordance with the first embodiment of the invention. Referring to FIG. 1, the projection display device includes a blue laser 1, a red laser 2, a green laser 3, a mirror 4, dichroic mirrors 5 and 6, a condenser lens 7, a first light diffusing element 8, a second light diffusing element 9, a drive circuit 10, a rod integrator 11, a lens 12, a polarized beam splitter 13, a spatial light modulation element 14, and a projection lens 15. The first light diffusing element 8, the second light diffusing element 9, and the drive circuit 10 constitute a speckle reduction element.

The blue laser 1 emits blue laser light, the red laser 2 emits red laser light, and the green laser 3 emits green laser light. A semiconductor laser is a preferred example of the blue laser 1 and the red laser 2. A solid-state laser incorporated with a SHG device is a preferred example of the green laser 3.

The mirror 4 reflects blue laser light. The dichroic mirror 5 selectively reflects red laser light, and transmits light of a wavelength other than the wavelength of the red laser light. The dichroic mirror 6 selectively reflects green laser light, and transmits light of a wavelength other than the wavelength of the green laser light. The condenser lens 7 condenses the blue laser light emitted from the blue laser 1, the red laser light emitted from the red laser 2, and the green laser light emitted from the green laser 3 on an incident surface of the rod integrator 11.

The first light diffusing element 8 and the second light diffusing element 9 each is formed by sandwiching a transparent film dispersedly containing a liquid crystal material by two transparent electrodes. In this embodiment, a "UMU film" of Nippon Sheet Glass Co., Ltd. is used as the transparent film. The first light diffusing element 8 and the second light diffusing element 9 are opaque when a voltage is not applied between the transparent electrodes. Once a voltage is applied between the transparent electrodes of the first light diffusing element 8 and the second light diffusing element 9, the degree of diffusion of laser light is reduced depending on a magnitude of the applied voltage, and finally, the first light diffusing element 8 and the second light diffusing element 9 are turned into a transparent state. Maximum values of the degrees of diffusion of laser light through the first light diffusing element 8 and the second light diffusing element 9 are made substantially identical to each other. The drive circuit 10 drives the first light diffusing element 8 and the second light diffusing element 9 by applying a voltage to the first light diffusing element 8 and the second light diffusing element 9. The rod integrator 11 is constituted of a square parallelepiped glass member, and is adapted to make a light amount distribution of the incident laser light substantially uniform.

The lens 12 is adapted to form an image at an exit end surface of the rod integrator 11 on the spatial light modulation element 14. The polarized beam splitter 13 separates the incident laser light into two polarization components whose polarization directions are orthogonal to each other. In this embodiment, the polarized beam splitter 13 transmits a P-polarized component, and reflects an S-polarized component. In this embodiment, the spatial light modulation element 14 is constituted of a reflective liquid crystal panel, and modulates an image at the exit end surface of the rod integrator 11. The projection lens 15 projects the image modulated by the spatial light modulation element 14 onto a screen 16.

In the following, an operation to be performed by the projection display device in the first embodiment is described referring to FIG. 1. Blue laser light emitted from the blue laser 1 is reflected on the mirror 4. Red laser light emitted from the red laser 2 and green laser light emitted from the green laser 3 are respectively wavelength-selectively reflected on the dichroic mirrors 5 and 6, and the reflected blue laser light, red laser light, green laser light are combined on a common optical axis. The combined laser light is condensed on an incident end surface of the rod integrator 11 by the condenser lens 7. The combined laser light is diffused through the first light diffusing element 8 and the second light diffusing element 9 depending on magnitudes of voltages to be applied to the first light diffusing element 8 and the second light diffusing element 9 by the drive circuit 10.

The laser light diffused by the first light diffusing element 8 and the second light diffusing element 9 is incident onto the rod integrator 11. The laser light incident onto the rod integrator 11 is multi-reflected in the interior of the rod integrator 11. Accordingly, a sufficiently uniform light amount distribution is obtained at the exit end surface of the rod integrator 11. The laser light outputted from the rod integrator 11 is irradiated onto the spatial light modulation element 14 through the lens 12 and the polarized beam splitter 13. The lens 12 is arranged at such a position that the exit end surface of the rod integrator 11 and the spatial light modulation element 14 have a conjugated relation. Laser light to be incident onto the polarized beam splitter 13 is S-polarized light, and is reflected on a reflection surface of the polarized beam splitter 13 for incidence onto the spatial light modulation element 14.

The spatial light modulation element 14 spatially modulates the irradiated light based on a signal from an unillustrated control circuit, and reflects the modulated light in such a manner that P-polarized light is incident onto the polarized beam splitter 13. After transmittance through the polarized beam splitter 13, the P-polarized light is projected onto the screen 16 by the projection lens 15 as an image. The blue laser 1, the red laser 2, and the green laser 3 sequentially emit pulse light, and the spatial light modulation element 14 spatially modulates the laser light, based on information relating to the respective color components in synchronism with the pulse emission, whereby color video light is obtained.

Figure 2:
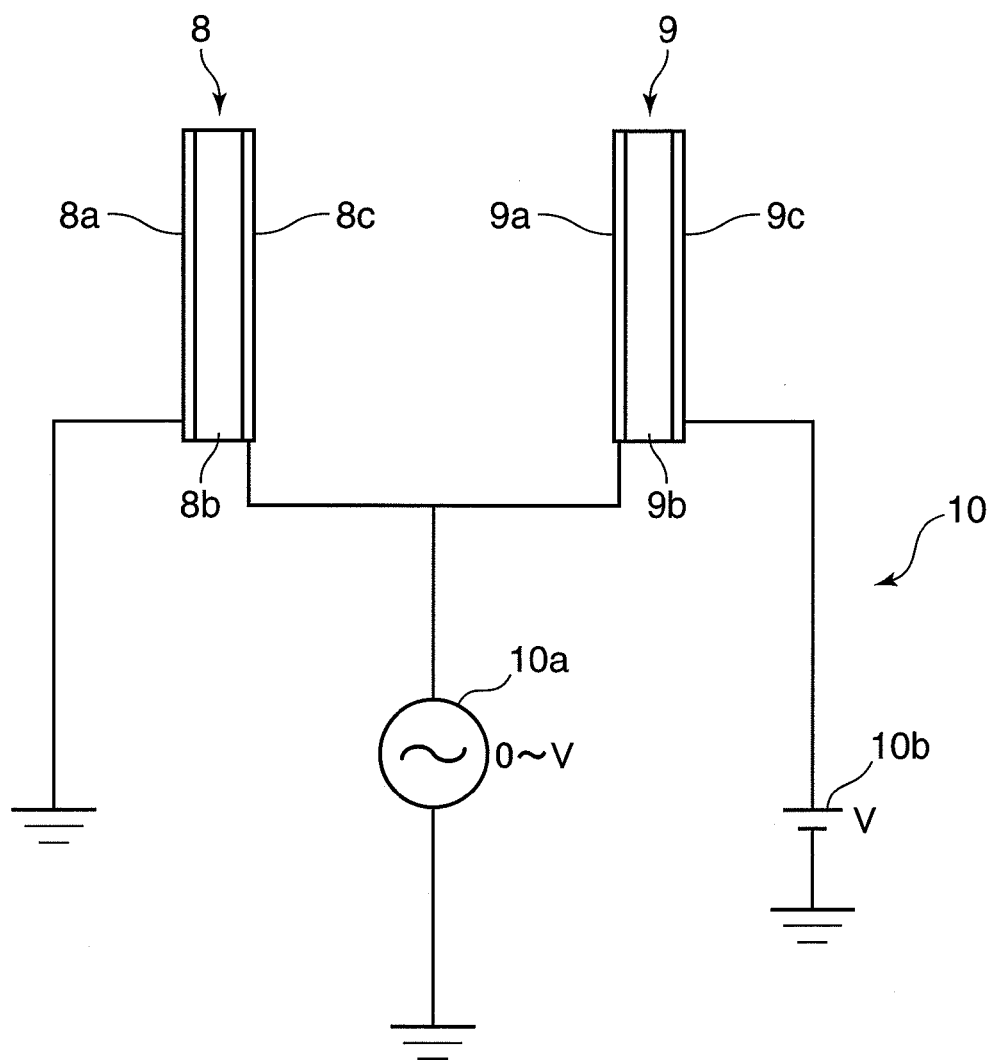
FIG. 2 is a schematic diagram showing an arrangement of a drive circuit of light diffusing elements in the first embodiment.

In the following, an operation to be performed by the first light diffusing element 8 and the second light diffusing element 9 is described referring to FIGS. 2 through 6. FIG. 2 is a schematic diagram showing an arrangement of the drive circuit of the light diffusing elements. Elements in FIG. 2 substantially identical or equivalent to those in FIG. 1 are indicated with the same reference numerals, and description thereof is omitted herein. Referring to FIG. 2, the first light diffusing element 8 is constituted of transparent electrodes 8*a* and 8*c*, and a liquid crystal dispersion film 8*b* sandwiched between the transparent electrodes 8*a* and 8*c*. The second light diffusing element 9 is constituted of transparent electrodes 9*a* and 9*c*, and a liquid crystal dispersion film 9*b* sandwiched between the transparent electrodes 9*a* and 9*c*.

The transparent electrode 8*a* of the first light diffusing element 8 is grounded, and the transparent electrode 8*c* thereof is connected to the transparent electrode 9*a* of the second light diffusing element 9 and also connected to an alternate current power source 10*a*. The transparent electrode 9*c* of the second light diffusing element 9 is connected to the transparent electrode 8*c* of the first light diffusing element 8 and also connected to the alternate current power source 10*a*. The transparent electrode 9*c* of the second light diffusing element 9 is connected to a direct current power source 10*b* for outputting a voltage of a value substantially equal to a maximum value of the output voltage of the alternate current power source 10*a*.

A voltage V is applied from the direct current power source 10*b* to the transparent electrode 9*c*. The transparent electrode 8*c* and the transparent electrode 9*a* are connected to each other, and an alternate current voltage from 0 to V is applied from the alternate current power source 10*a* to the transparent electrode 8*c* and the transparent electrode 9*c*, respectively. The cycle of voltage change is set to e.g. 60 Hz. In the case where the respective voltages of the transparent electrode 8*c* and the transparent electrode 9*a* are set to 0, the applied voltage to the first light diffusing element 8 is set to 0. Accordingly, the first light diffusing element 8 is turned into a scattering state. Simultaneously, the applied voltage to the second light diffusing element 9 is set to V, and the second light diffusing element 9 is turned into a transparent state. On the other hand, in the case where the respective voltages of the transparent electrode 8*c* and the transparent electrode 9*a* are set to V, the applied voltage to the first light diffusing element 8 is set to V. Accordingly, the first light diffusing element 8 is turned into a transparent state. Simultaneously, the applied voltage to the second light diffusing element 9 is set to 0, and the second light diffusing element 9 is turned into a scattering state.

Figure 3:
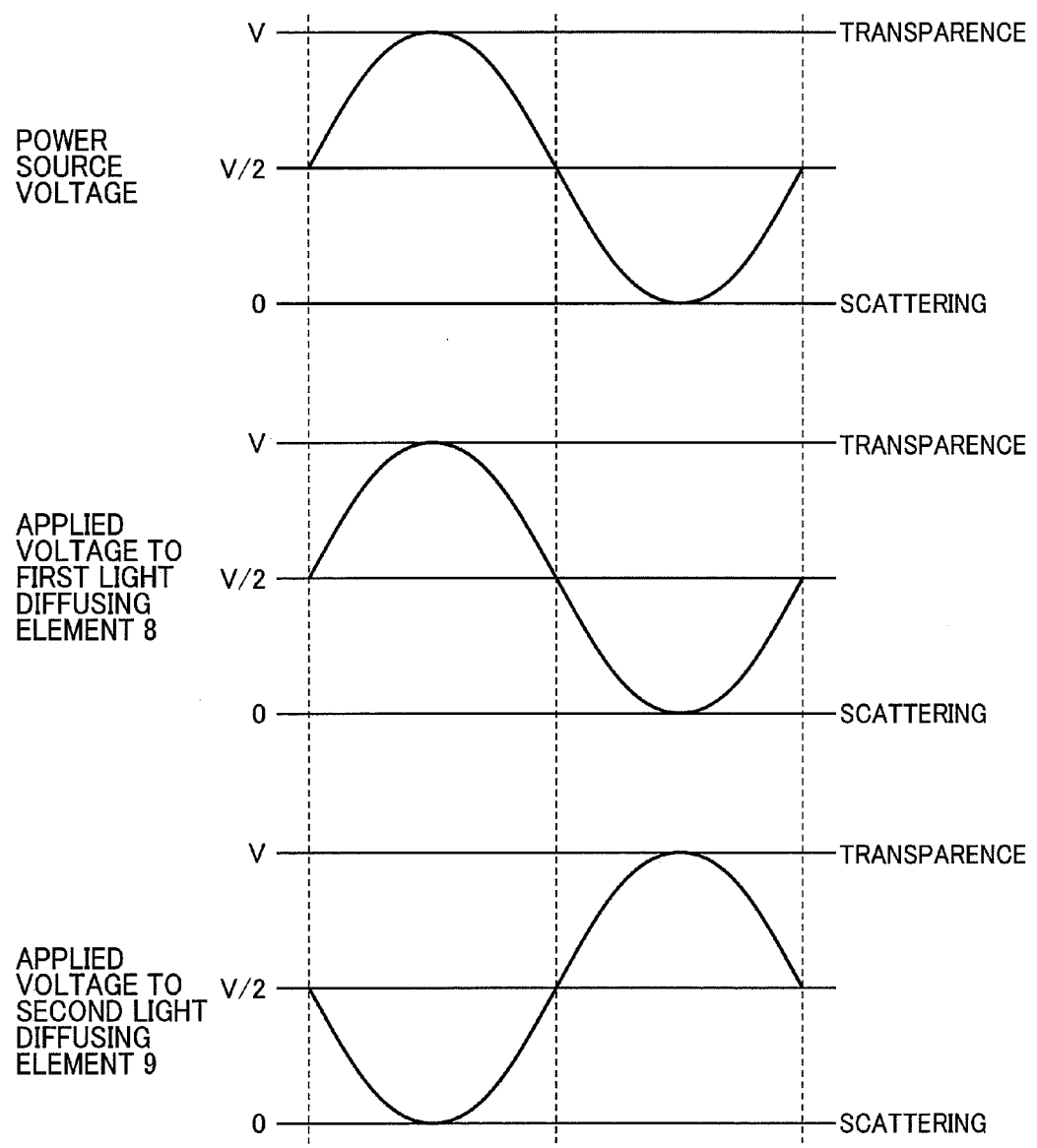
FIG. 3 is a diagram showing a change of a power source voltage with time, and changes of voltages to be applied to the two light diffusing elements with time.

FIG. 3 is a diagram showing a change of a power source voltage with time, and changes of voltages to be applied the first light diffusing element 8 and the second light diffusing element 9 with time. As shown in FIG. 3, the power source voltage of the alternate current power source 10*a* is changed from 0 to V, and the first light diffusing element 8 and the second light diffusing element 9 are repeatedly switched between a scattering state and a transparent state once per cycle. In the case where a maximum value V of the alternate current voltage is applied to the first light diffusing element 8 and the second light diffusing element 9, the first light diffusing element 8 and the second light diffusing element 9 are turned into a transparent state. In the case where a minimum value 0 of the alternate current voltage is applied to the first light diffusing element 8 and the second light diffusing element 9, the first light diffusing element 8 and the second light diffusing element 9 are turned into a maximally scattering state. In the case where the alternate current voltage value is changed from V to 0, the first light diffusing element 8 and the second light diffusing element 9 are each changed from a transparent state (i.e. a minimally scattering state) to a maximally scattering state. In the case where the alternate current voltage value is changed from 0 to V, the first light diffusing element 8 and the second light diffusing element 9 are changed from a maximally scattering state to a transparent state (i.e. a minimally scattering state). Also, a voltage waveform of an applied voltage to the first light diffusing element 8 is shifted from a voltage waveform of an applied voltage to the second light diffusing element 9 by ½ cycle. Specifically, in the case where the first light diffusing element 8 is in a transparent state, the second light diffusing element 9 is in a scattering state; and in the case where the first light diffusing element 8 is in a scattering state, the second light diffusing element 9 is in a transparent state.

Figure 4:
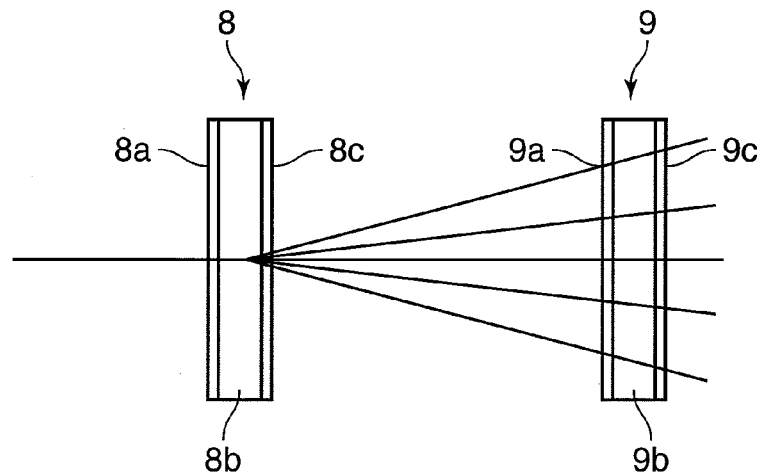
FIG. 4 is a diagram showing how light is scattered through the light diffusing elements in the case where the applied voltage to the first light diffusing element is set to 0, and the applied voltage to the second light diffusing element is set to V.
Figure 5:
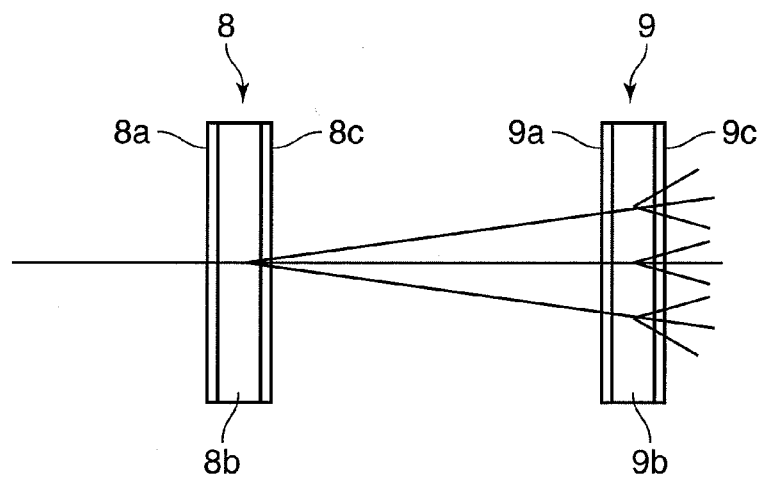
FIG. 5 is a diagram showing how light is scattered through the light diffusing elements in the case where the applied voltage to the first light diffusing element is set to V', and the applied voltage to the second light diffusing element is set to V-V'.
Figure 6:
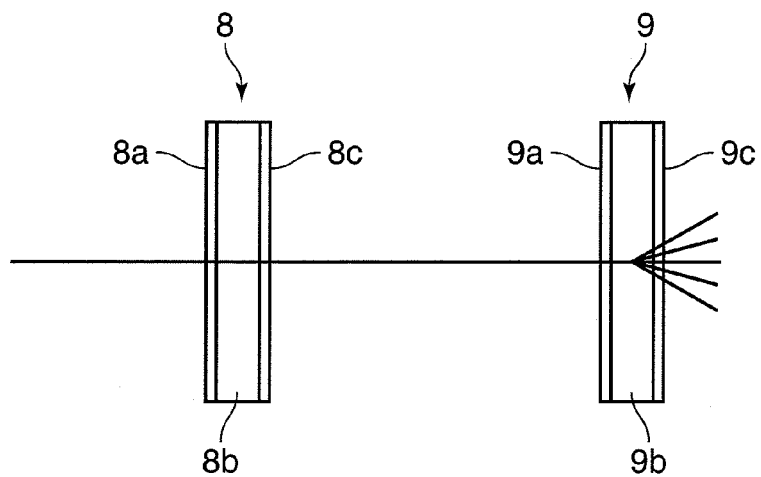
FIG. 6 is a diagram showing how light is scattered through the light diffusing elements in the case where the applied voltage to the first light diffusing element is set to V, and the applied voltage to the second light diffusing element is set to 0.

FIGS. 4 through 6 show how light is scattered through the light diffusing elements. FIG. 4 is a diagram showing how light is scattered through the light diffusing elements, in the case where the applied voltage to the first light diffusing element 8 is set to 0, and the applied voltage to the second light diffusing element 9 is set to V. FIG. 5 is a diagram showing how light is scattered through the light diffusing elements, in the case where the applied voltage to the first light diffusing element 8 is set to V', and the applied voltage to the second light diffusing element 9 is set to V-V'. FIG. 6 is a diagram showing how light is scattered through the light diffusing elements, in the case where the applied voltage to the first light diffusing element 8 is set to V, and the applied voltage to the second light diffusing element 9 is set to 0. The voltage V' is an optional value between 0 and V.

As shown in FIGS. 4 through 6, while the alternate current voltage to be applied to the transparent electrode 8*c* and the transparent electrode 9*a* is changed from 0 to V, the light scattering condition at the first light diffusing element 8 and the second light diffusing element 9 is changed from the state of FIG. 4 to the state of FIG. 5, and then to the state of FIG. 6. Specifically, as shown in FIG. 4, in the case where the alternate current voltage is set to 0, the first light diffusing element 8 is operable to scatter the incident laser light, and the second light diffusing element 9 is operable to transmit the laser light that has been scattered through the first light diffusing element 8. Further, as shown in FIG. 5, in the case where the alternate current voltage is set to V' (i.e. a value between 0 and V), the first light diffusing element 8 is operable to scatter the incident laser light, and the second light diffusing element 9 is operable to further scatter the laser light that has been scattered through the first light diffusing element 8. Furthermore, as shown in FIG. 6, in the case where the alternate current voltage is set to V, the first light diffusing element 8 is operable to transmit the incident laser light, and the second light diffusing element 9 is operable to scatter the laser light that has been transmitted through the first light diffusing element 8.

As described above, since the first light diffusing element 8 and the second light diffusing element 9 alternately repeat light scattering and light transmission, this operation is substantially equivalent to an operation that the position for scattering laser light is shifted between the first light diffusing element 8 and the second light diffusing element 9. Since the angle of light for illuminating the pixels of the spatial light modulation element 14 shown in FIG. 1 is changed at a high speed, an interference pattern on the screen 16 i.e. speckle noise is changed at such a speed that the human eye cannot follow, and as a result, speckle noise can be reduced.

Further, considering spectral luminous efficiency, speckle noise in green laser light is liable to be detected, as compared with speckle noise in red laser light or blue laser light. In view of this, setting the voltage V1 to be applied to the first light diffusing element 8 and the second light diffusing element 9 during emission of the green laser 3 smaller than the voltage V2 to be applied to the first light diffusing element 8 and the second light diffusing element 9 during emission of the blue laser 1 and the red laser 2 enables to set the degree of diffusion of green laser light larger than the degree of diffusion of blue laser light and red laser light. This is advantageous in reducing speckle noise in green laser light, and reducing loss in light use efficiency resulting from diffusion of blue laser light and red laser light.

In this embodiment, the cycle of voltage change is set to e.g. 60 Hz. The invention is not specifically limited to the above. The cycle of voltage change may be set to 10 Hz or more. The frequency (i.e. the critical flicker frequency) at which the human eye may detect flickering of an image varies depending on the viewer's age or visual environment, but is generally conceived to be about 60 Hz. The flickering of an image corresponds to a perception in the case where the entirety of a screen flickers. In the case where a luminance difference within a screen such as speckle noise is perceived, a frequency at which the human eye may detect flickering of an image is further decreased. In the case where the luminance change is 0%, no image flickering is detected (i.e. the critical flicker frequency=0 Hz). Assuming that flickering on the entirety of a screen where the luminance change has reached 100% can be perceived at a frequency of about 60 Hz, in the case where the luminance change is about 20 to 30%, which corresponds to a condition that speckle noise is generated, the speckle noise can be sufficiently reduced by driving the first light diffusing element 8 and the second light diffusing element 9 at a frequency of 10 to 20 Hz or more.

Further, the second light diffusing element 9, which is located on the projection lens side out of the two light diffusing elements, is disposed in proximity to the rod integrator 11. Assuming that the aperture diameter of the rod integrator 11 is A, the distance between the first light diffusing element 8 on the light source side, and the second light diffusing element 9 on the projection lens side is L, and the maximum diffusion angle of the first light diffusing element 8 and the second light diffusing element 9 is θ (rad), the distance L between the light diffusing elements is expressed by the following formula (1).

$$L < A/(2\theta) \tag{1}$$

Defining the distance L between the light diffusing elements to satisfy the formula (1) allows all the laser light to be incident into the aperture of the rod integrator 11, even in a condition that the first light diffusing element 8 on the light source side diffuses the laser light at the maximum diffusion angle. This enables to eliminate loss in light amount, secure a maximum light diffusion effect, and maximally obtain an effect of removing speckle noise.

Even in the case where three or more light diffusing elements are provided, it is preferable to define the distance L between the light diffusing element closest to the light source, and the light diffusing element closest to the projection lens to such a value that satisfies the formula (1).

In the above arrangement, speckle noise can be reduced by arranging the first light diffusing element 8 and the second light diffusing element 9 in the optical axis direction, and shifting the cycle of change in the degree of diffusion of laser light through the first light diffusing element 8 and the second light diffusing element 9 by a one-half cycle. Also, changing the degree of diffusion of laser light through the first light diffusing element 8 and the second light diffusing element 9 depending on the wavelengths of the respective laser light enables to optimally reduce speckle noise with respect to each of the wavelengths. Further, since the first light diffusing element 8 and the second light diffusing element 9 are arranged on a converging optical path of the condenser lens 7, the beam diameter of laser light diffused through the first light diffusing element 8 and the second light diffusing element 9 can be made smaller than the object-side NA (numerical aperture) of the projection lens 15. This is advantageous in preventing lowering of light use efficiency resulting from diffused light having a beam diameter larger than the object-side NA of the projection lens 15.

In the embodiment, a hollow light pipe may be used in place of the rod integrator 11. Further alternatively, three or more light diffusing elements may be provided. Also, in the embodiment, a reflective liquid crystal element is used as the spatial light modulation element. Alternatively, a spatial light modulation element such as a digital micromirror device may be used. It should be noted that the rod integrator 11 is provided merely to make the light amount distribution substantially uniform, and has no relation to the idea of reducing speckle noise. Accordingly, as far as the light amount distribution is changed within an allowable range, the rod integrator 11 may be omitted. In the embodiment, the degrees of diffusion of laser light through the first light diffusing element 8 and the second light diffusing element 9 are made substantially identical to each other. Alternatively, the degrees of diffusion of laser light through the first light diffusing element 8 and the second light diffusing element 9 may be made different from each other. For instance, setting the degree of diffusion of laser light through the first light diffusing element 8 smaller than the degree of diffusion of laser light through the second light diffusing element 9 enables to reduce loss in light amount at the incident end surface of the rod integrator 11.

SECOND EMBODIMENT

Figure 7:
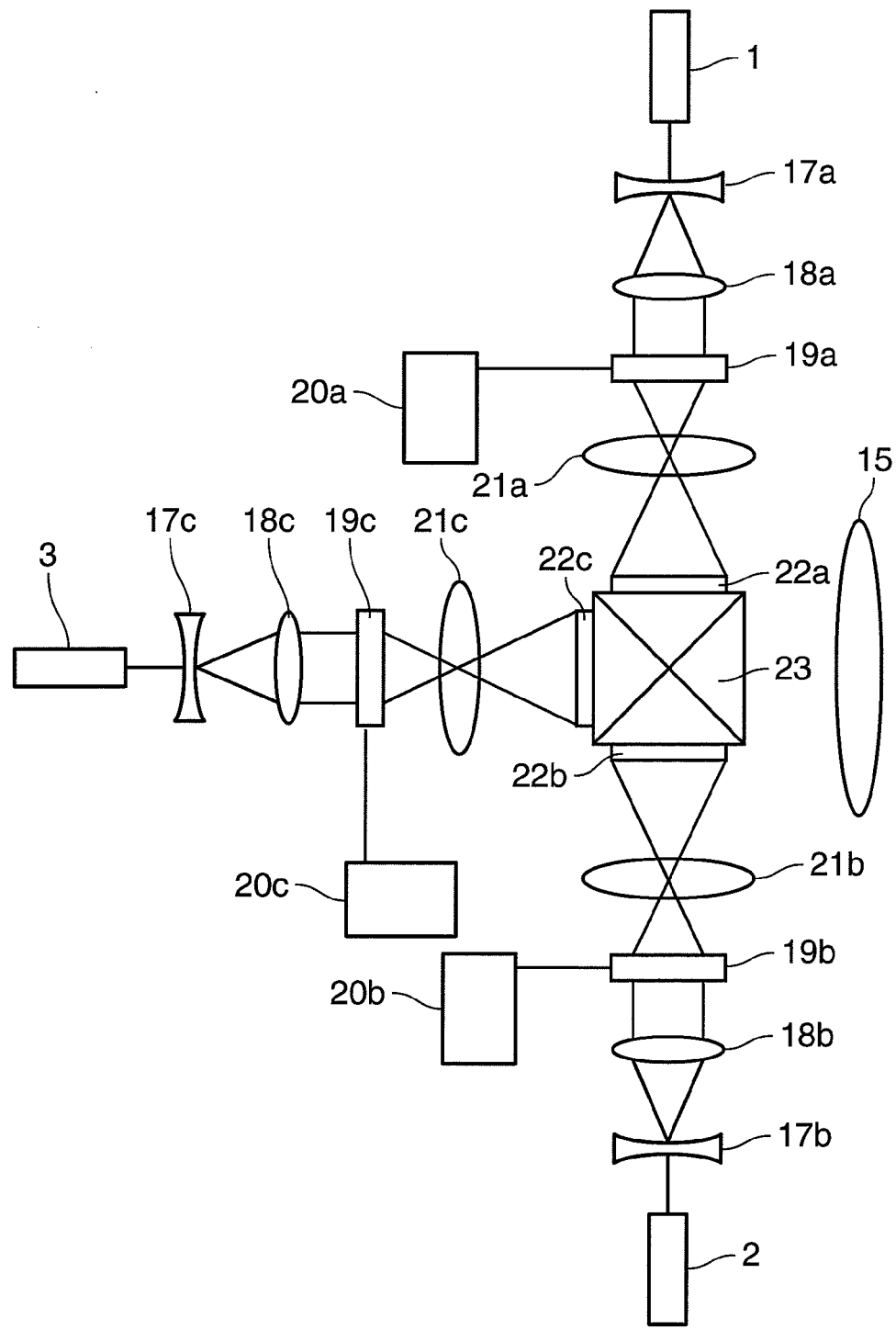
FIG. 7 is a diagram showing an arrangement of a projection display device in accordance with a second embodiment of the invention.

In this section, a projection display device in accordance with the second embodiment of the invention is described. FIG. 7 is a diagram showing an arrangement of the projection display device in accordance with the second embodiment. Elements in FIG. 7 substantially identical or equivalent to those in FIG. 1 are indicated with the same reference numerals, and description thereof is omitted herein.

Referring to FIG. 7, the projection display device includes a blue laser 1, a red laser 2, a green laser 3, concave lenses 17a, 17b, and 17c, convex lenses 18a, 18b, and 18c, light diffusers 19a, 19b, and 19c, drive circuits 20a, 20b, and 20c, lenses 21a, 21b, and 21c, spatial light modulation elements 22a, 22b, and 22c, a color combination prism 23, and a projection lens 15.

The concave lens 17a and the convex lens 18a, the concave lens 17b and the convex lens 18b, and the concave lens 17c and the convex lens 18c respectively constitute beam expander optical systems. The concave lenses 17a through 17c each enlarges incident laser light, and the convex lenses 18a through 18c each converts the incident laser light into parallel light. The light diffusers 19a through 19c each diffuses the incident laser light. The light diffusers 19a through 19c will be described later. The drive circuits 20a through 20c drive the light diffusers 19a through 19c by applying voltages to the light diffusers 19a through 19c, respectively. The lenses 21a through 21c respectively guide laser light that has been diffused through the light diffusers 19a through 19c to the spatial light modulation elements 22a through 22c. In this embodiment, the spatial light modulation elements 22a through 22c each is constituted of a transmissive liquid crystal panel, and modulate the laser light that has been diffused through the light diffusers 19a through 19c, respectively. The color combination prism 23 combines the laser lights that have been modulated by the spatial light modulation elements 22a through 22c.

In the following, an operation to be performed by the projection display device in accordance with the second embodiment is described referring to FIG. 7. Since the operation on laser light to be emitted from the blue laser 1 is substantially the same as the operation on laser light to be emitted from the red laser 2 and the green laser 3, merely the operation on laser light to be emitted from the blue laser 1 is described referring to FIG. 7, and description on the operations on the other laser light are omitted herein.

Laser light emitted from the blue laser 1 is expanded by the beam expander optical system constituted of the concave lens 17a and the convex lens 18a for incidence onto the light diffuser 19a. The degree of diffusion of laser light through the light diffuser 19a is temporally and spatially changed by the drive circuit 20a, whereby the laser light transmitted through the light diffuser 19a is diffused. The laser light diffused through the light diffuser 19a is transmitted through the lens 21a, and illuminates the spatial light modulation element 22a. The spatial light modulation element 22a spatially modulates the laser light based on a color signal of a blue color component in an image to be projected. The spatially modulated laser light is combined with laser lights of the other colors on a common optical axis by the color combination prism 23. The laser light combined by the color combination prism 23 is projected on an unillustrated screen by the projection lens 15 as an image.

Figure 8:
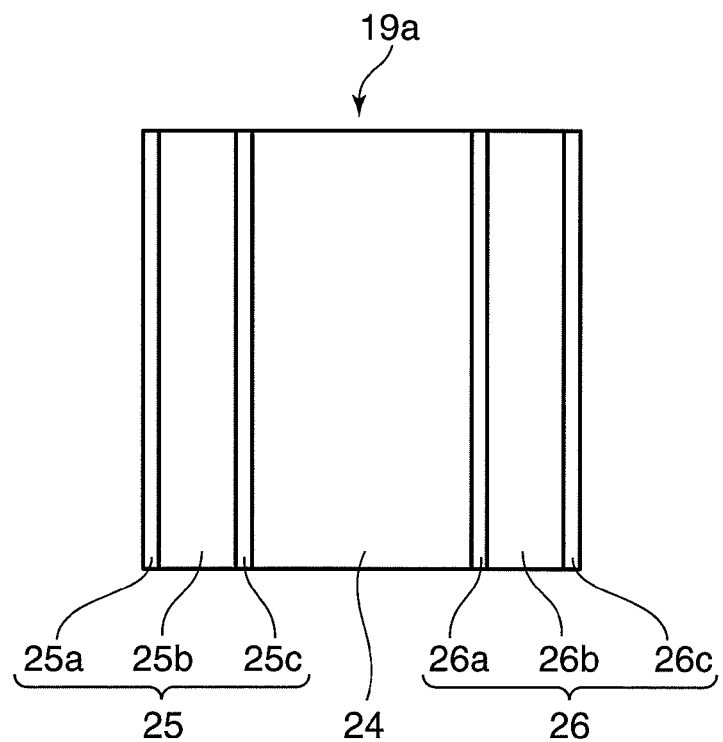
FIG. 8 is a side view of a light diffuser in the second embodiment.
Figure 9:
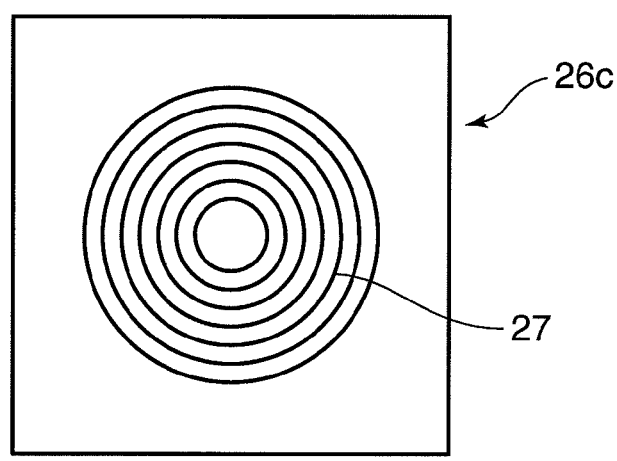
FIG. 9 is a plan view of an electrode of a light diffusing element in the second embodiment.

The arrangement and the operation of the light diffuser 19a are described referring to FIGS. 8 and 9. FIGS. 8 and 9 are diagrams showing the arrangement of the light diffuser 19a. FIG. 8 is a side view of the light diffuser 19a in the second embodiment, and FIG. 9 is a plan view of an electrode of the light diffuser 19a in the second embodiment. The arrangements of the light diffusers 19b and 19c are substantially the same as the arrangement of the light diffuser 19a.

Referring to FIG. 8, the light diffuser 19a includes a first light diffusing element 25, a second light diffusing element 26, and a common substrate 24. The first light diffusing element 25 is constituted of transparent electrodes 25a and 25c, and a liquid crystal dispersion film 25b sandwiched between the transparent electrodes 25a and 25c. The second light diffusing element 26 is constituted of transparent electrodes 26a and 26c, and a liquid crystal dispersion film 26b sandwiched between the transparent electrode 26a and 26c. The common substrate 24 is adapted to guide the laser light that has been transmitted or diffused through the first light diffusing element 25 to the second light diffusing element 26. The first light diffusing element 25 and the second light diffusing element 26 are attached to the common substrate 24 in such a manner that the transparent electrode 25c of the first light diffusing element 25 faces the transparent electrode 26a of the second light diffusing element 26.

Referring to FIG. 9, an annular transparent electrode 27 is formed by dividing the transparent electrode 26c into multiple annular regions around the optical axis. Although the one annular transparent electrode 27 is illustrated in FIG. 9, plural annular transparent electrodes 27 are co-axially formed in the entirety of a region where the laser light is transmitted. In other words, similarly to the transparent electrode 26c, another annular transparent electrode 27 is formed by dividing the transparent electrode 25a into multiple annular regions around the optical axis.

The operation of the light diffuser 19a in the second embodiment is different from the operation of the first light diffusing element 8 and the second light diffusing element 9 in the first embodiment in a point that the annular transparent electrode 27 is formed, and the degrees of diffusion of laser light through the light diffuser 19a are made spatially different. Specifically, different voltages are applied to the multiple annular regions constituting the annular transparent electrode 27. For instance, a voltage of such a value as to increase the degree of diffusion is applied to a central region of the annular transparent electrode 27, and a voltage of such a value as to decrease the degree of diffusion is applied to a peripheral region of the annular transparent electrode 27. The light intensity distribution of laser light has a characteristic that the light intensity is large at a central region, and the light intensity is small at a peripheral region. Accordingly, increasing the degree of diffusion in a region where the light intensity is large, and reducing the degree of diffusion in a region where the light intensity is small is advantageous in making the light intensity distribution of laser light transmitted through the light diffuser 19a substantially uniform.

In the embodiment, the annular region may include an elliptical region around the optical axis, as well as a circular region around the optical axis.

As described above, forming the annular transparent electrode 27 as shown in FIG. 9 on the transparent electrode 25a of the first light diffusing element 25 and on the transparent electrode 26c of the second light diffusing element 26, and applying different voltages to the multiple annular regions of the annular transparent electrodes 27, while applying an alternate current voltage to the transparent electrode 25c and the transparent electrode 26a enables to temporally and spatially change the degree of diffusion of laser light, reduce speckle noise, and make the light intensity distribution of laser light substantially uniform. In this arrangement, the light intensity distribution of laser light can be made substantially uniform, and speckle noise can be reduced by temporally and spatially changing the degree of diffusion of laser light through the light diffuser.

Also, the multiple regions include multiple annular regions around the optical axis. Accordingly, the degree of diffusion can be spatially changed depending on the cross sectional shape of laser beam, and the light intensity distribution of laser light can be made substantially uniform. Alternatively, the multiple annular regions may be formed in such a manner that the degree of diffusion of laser light is reduced, as the light diffusing position is directed from the central annular region toward the peripheral annular region. Specifically, the light intensity distribution of laser light has a characteristic that the light intensity is large at a central region, and the light intensity is small at a peripheral region. Accordingly, increasing the degree of diffusion in a region where the light intensity is large, and reducing the degree of diffusion in a region where the light intensity is small is more advantageous in making the light intensity distribution of laser light that has been transmitted through the light diffuser 19a substantially uniform. Further, by forming the first light diffusing element 25 and the second light diffusing element 26 as opposed to each other on a plane perpendicular to the optical axis of the transparent common substrate 24, the distance between the first light diffusing element 25 and the second light diffusing element 26 is predefined by the common substrate 24, which eliminates the need of relative positioning of the first light diffusing element 25 and the second light diffusing element 26, and enables to reduce the thickness of the light diffuser 19a in the optical axis direction.

In the first and the second embodiments, an alternate current voltage is applied to the common electrode (i.e. the transparent electrodes 8c and 9a) of the first light diffusing element 8 and the second light diffusing element 9. The invention is not limited to the above. A voltage may be applied to the first light diffusing element 8 and the second light diffusing element 9 independently of each other.

Figure 10:
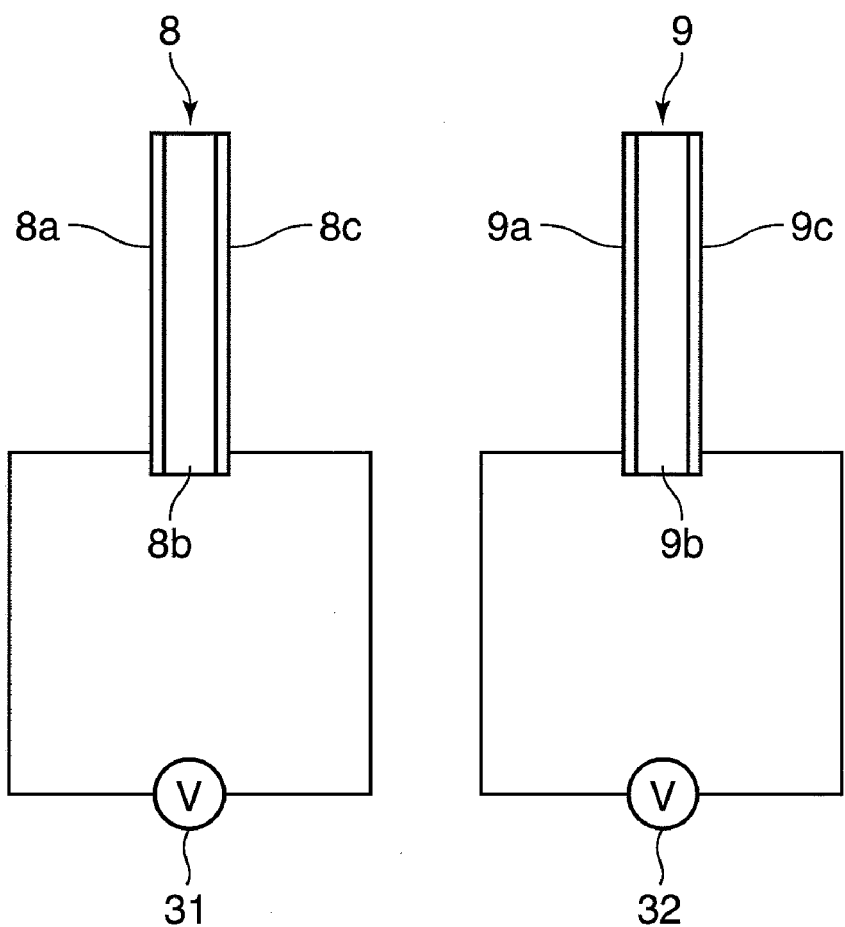
FIG. 10 is a diagram showing an arrangement of two light diffusing elements in the case where a voltage is applied to the light diffusing elements independently of each other.

FIG. 10 is a diagram showing an arrangement of light diffusing elements in the case where a voltage is applied to the light diffusing elements independently of each other. Transparent electrodes 8a and 8c of a first light diffusing element 8 are connected to a first alternate current power source 31 for applying an alternate current voltage that varies cyclically from −V to +V. Transparent electrodes 9a and 9c of a second light diffusing element 9 are connected to a second alternate current power source 32 for applying an alternate current voltage that varies cyclically from −V to +V. In the case where the applied voltages to the first light diffusing element 8 and the second light diffusing element 9 are respectively set to +V and −V, the first light diffusing element 8 and the second light diffusing element 9 are turned into a scattering state. In the case where the applied voltages to the first light diffusing element 8 and the second light diffusing element 9 are respectively set to 0, the first light diffusing element 8 and the second light diffusing element 9 are turned into a transparent state.

Figure 11:
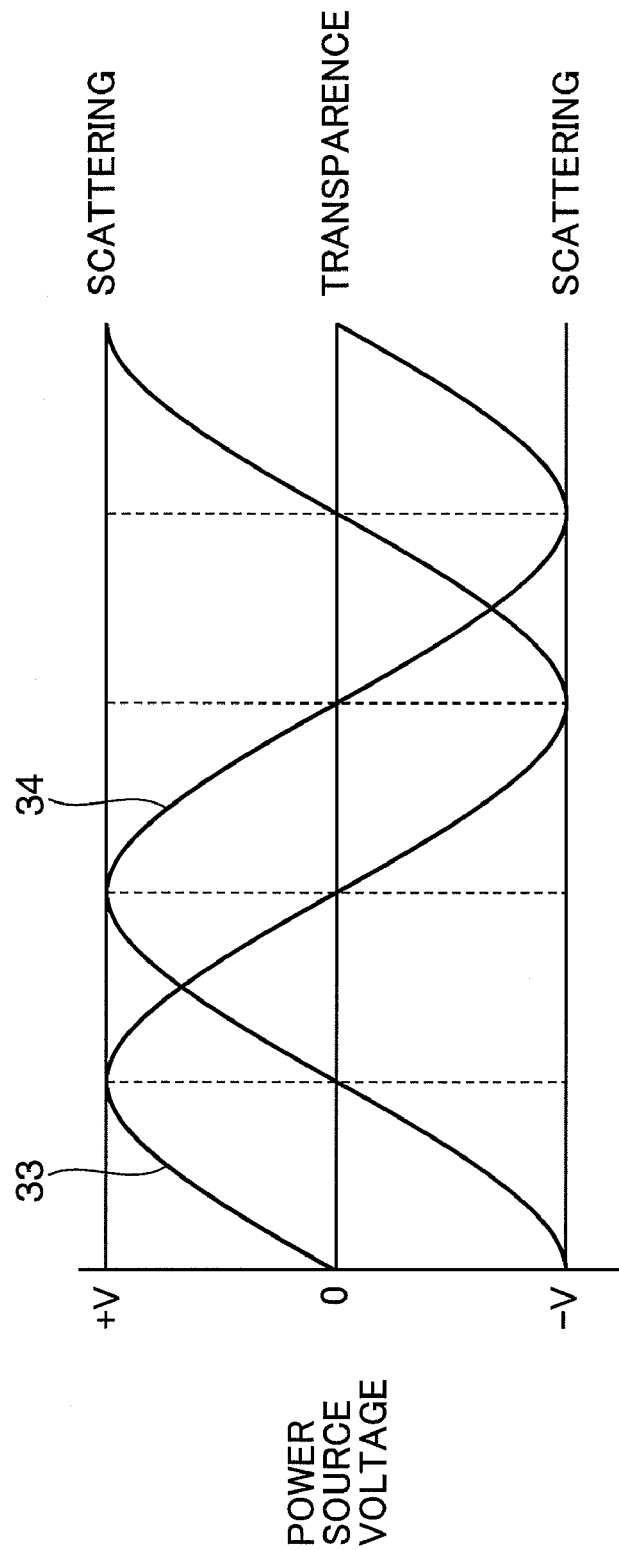
FIG. 11 is a diagram showing changes of voltages to be applied to the two light diffusing elements with time, respectively.
Figure 12:
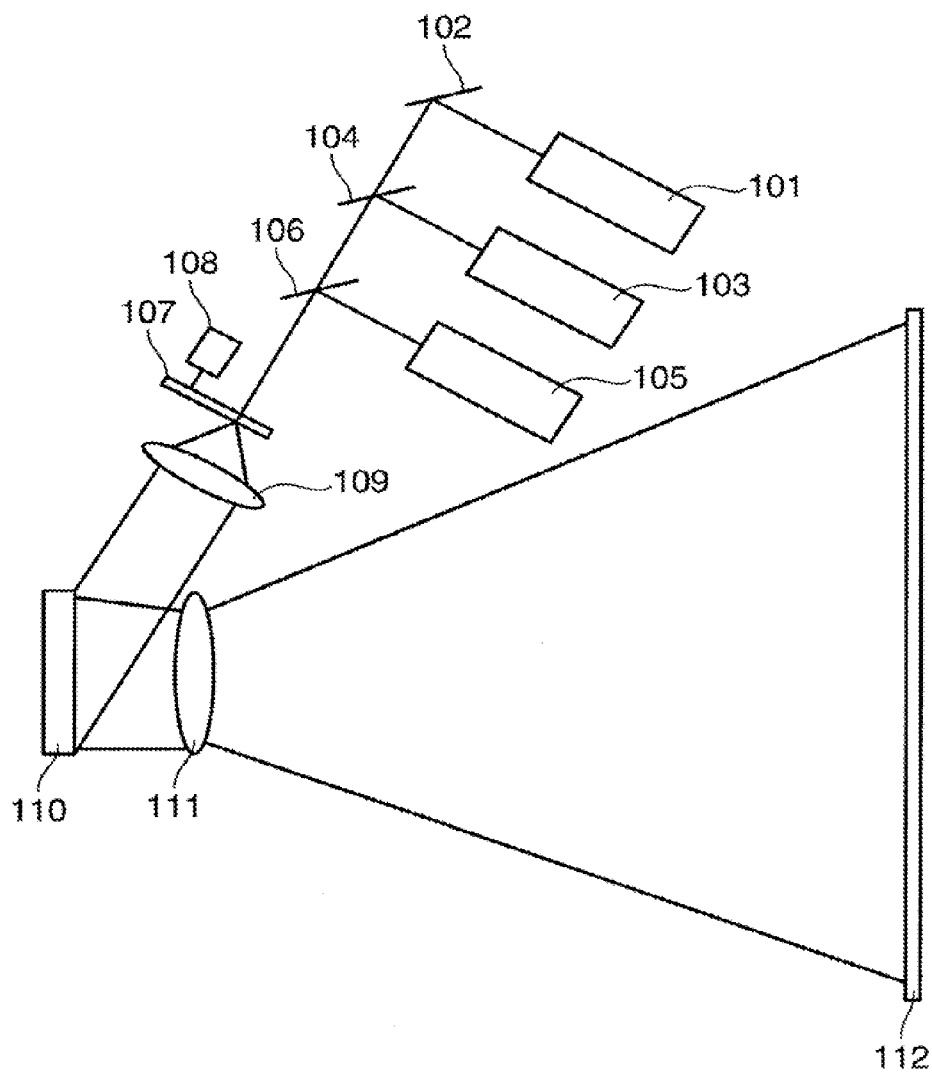
FIG. 12 is a diagram showing an arrangement of a conventional projection display device.

FIG. 11 is a diagram showing changes of voltages to be respectively applied to the two light diffusing elements with time. As shown in FIG. 11, a voltage waveform 33 of an applied voltage to the first light diffusing element 8 is shifted from a voltage waveform 34 of an applied voltage to the second light diffusing element 9 by ¼ cycle. Accordingly, in the case where the applied voltage to the first light diffusing element 8 is set to +V, the first light diffusing element 8 is turned into a scattering state. At this time, the applied voltage to the second light diffusing element 9 is set to 0, and the second light diffusing element 9 is turned into a transparent state. Also, in the case where the applied voltage to the first light diffusing element 8 is set to 0, the first light diffusing element 8 is turned into a transparent state. At this time, the applied voltage to the second light diffusing element 9 is set to +V, and the second light diffusing element 9 is turned into a scattering state. Further, in the case where the applied voltage to the first light diffusing element 8 is set to −V, the first light diffusing element 8 is turned into a scattering state. At this time, the applied voltage to the second light diffusing element 9 is set to 0, and the second light diffusing element 9 is turned into a transparent state.

In the case where an alternate current voltage value ±V is applied to the first light diffusing element 8 and the second light diffusing element 9, the first light diffusing element 8 and the second light diffusing element 9 are turned into a maximally scattering state. In the case where an alternate current voltage value 0 is applied to the first light diffusing element 8 and the second light diffusing element 9, the first light diffusing element 8 and the second light diffusing element 9 are turned into a transparent state. In the case where the alternate current voltage value is changed from +V to 0, the first light diffusing element 8 and the second light diffusing element 9 are changed from a maximally scattering state to a transparent state (i.e. a minimally scattering state). In the case where the alternate current voltage value is changed from 0 to −V, the first light diffusing element 8 and the second light diffusing element 9 are changed from a transparent state (i.e. a minimally scattering state) to a maximally scattering state. In the case the alternate current voltage value is changed from −V to 0, the first light diffusing element 8 and the second light diffusing element 9 are changed from a maximally scattering state to a transparent state (i.e. a minimally scattering state). In the case where the alternate current voltage value is changed from 0 to +V, the first light diffusing element 8 and the second light diffusing element 9 are changed from a transparent state (i.e. a minimally scattering state) to a maximally scattering state.

As described above, even in a condition that a voltage is applied to the first light diffusing element 8 and the second light diffusing element 9 independently of each other, the angle of light for illuminating the pixels of the spatial light modulation element 14 is changed at a high speed. Accordingly, an interference pattern on the screen 16 i.e. speckle noise is changed at such a speed that the human eye cannot follow, and as a result, speckle noise can be reduced.

The aforementioned projection display device has two light diffusing elements, and a voltage is applied to the light diffusing elements independently of each other. The invention is not limited to the above. Three or more light diffusing elements may be provided, and a voltage may be applied to the light diffusing elements independently of each other. In particular, in the case where light diffusing elements of the number (n) (where n is a positive integer) are provided, and a voltage is applied to the light diffusing elements independently of each other, a phase difference of a voltage to be applied to the respective light diffusing elements is set to $1/(2n)$ cycle. In this arrangement, even in a condition that a voltage is applied to the (n) light diffusing elements independently of each other, the angle of light for illuminating the pixels of the spatial light modulation element 14 is changed at a high speed. Accordingly, an interference pattern on the screen 16 i.e. speckle noise is changed at such a speed that the human eye cannot follow, and as a result, speckle noise can be reduced.

Furthermore, the two light diffusing elements in the embodiments change the degree of diffusion in an analog manner. The invention is not specifically limited to the above. In the case where three or more light diffusing elements are provided, the degree of diffusion of the light diffusing elements may be changed in a digital manner. The modification is advantageous, because an inexpensive noise-resistant digital circuit can be used as a drive circuit for driving the light diffusing elements. Increasing the number of light diffusing elements enables to change the degree of diffusion with high precision. Also, similarly to the arrangement that an increased number of light diffusing elements are used, even in the arrangement that two light diffusing elements are provided, the degree of diffusion can be changed with high precision by driving the light diffusing elements in an analog manner (i.e. based on multi-value data).

In the embodiments, the applied voltage to the respective light diffusing elements has a sinusoidal waveform. The invention is not specifically limited to the above. The applied voltage to the respective light diffusing elements may have e.g. a triangular waveform, or a waveform operable to complementarily cancel the applied voltages to the light diffusing elements.

The foregoing embodiments may primarily embrace the inventions having the following arrangements.

A projection display device according to an aspect of the invention includes: a laser light source; a spatial light modulation element for modulating laser light to be emitted from the laser light source; a projection lens for projecting the laser light modulated by the spatial light modulation element onto a screen; and a plurality of light diffusing elements, arranged on an optical axis between the laser light source and the spatial light modulation element, for changing a degree of diffusion of the laser light temporally and electrically.

In the above arrangement, the laser light is emitted from the laser light source. The laser light emitted from the laser light source is modulated by the spatial light modulation element.

The laser light modulated by the spatial light modulation element is projected onto the screen by the projection lens. Also, the plurality of the light diffusing elements arranged on the optical axis between the laser light source and the spatial light modulation element are operable to change the degree of diffusion of the laser light temporally and electrically.

In the above arrangement, unlike the conventional art, wherein an actuator is used to mechanically change the degree of diffusion, the degree of diffusion is electrically changed. This enables to miniaturize the projection display device, and enhance reliability of the device. Further, since the degree of diffusion of the laser light is temporally changed, speckle noise can be reduced.

In the projection display device, preferably, the plurality of the light diffusing elements may be operable to cyclically change the degree of diffusion, respectively, and a phase of the cyclic change in the degree of diffusion may be shifted with respect to each of the light diffusing elements.

In the above arrangement, since the plurality of the light diffusing elements are operable to cyclically change the degree of diffusion, respectively, and the phase of the cyclic change in the degree of diffusion is shifted with respect to each of the light diffusing elements, speckle noise can be changed temporally.

In the projection display device, preferably, the plurality of the light diffusing elements may be arranged on a converging optical path. In this arrangement, since the plurality of the light diffusing elements are arranged on the converging optical path, the beam diameter of the laser light diffused through the plurality of the light diffusing elements can be made smaller than the object-side numerical aperture of the projection lens. This enables to prevent lowering of light use efficiency resulting from diffused light having a beam diameter larger than the object-side numerical aperture of the projection lens.

In the projection display device, preferably, the plurality of the light diffusing elements may include two light diffusing elements each operable to change from a scattering state to a transparent state once per cycle, and a phase difference between the two light diffusing elements may be a one-half cycle.

In the above arrangement, the phase difference between the two light diffusing elements, each of which is operable to change from a scattering state to a transparent state once per cycle, is a one-half cycle. Accordingly, if one of the light diffusing elements is in a scattering state, the other of the light diffusing elements is in a transparent state. Since the angle of light for illuminating the pixels of the spatial light modulation element is changed at a high speed, speckle noise is changed at such a speed that the human eye cannot follow, and as a result, speckle noise can be reduced.

In the projection display device, preferably, the plurality of the light diffusing elements may include a first light diffusing element and a second light diffusing element, each of which has a transparent film dispersedly containing a liquid crystal material, and two transparent electrodes for sandwiching the transparent film therebetween, one of the transparent electrodes of the first light diffusing element may be grounded, and the other of the transparent electrodes thereof may be connected to one of the transparent electrodes of the second light diffusing element and to an alternate current power source, and the one of the transparent electrodes of the second light diffusing element may be connected to the other of the transparent electrodes of the first light diffusing element and to the alternate current power source, and the other of the transparent electrodes thereof may be connected to a direct current power source for outputting a voltage of a value substantially equal to a maximum value of an output voltage of the alternate current power source.

In the above arrangement, the first light diffusing element and the second light diffusing element each has the transparent film dispersedly containing the liquid crystal material, and the two transparent electrodes for sandwiching the transparent film therebetween. The one of the transparent electrodes of the first light diffusing element is grounded, and the other of the transparent electrodes thereof is connected to the one of the transparent electrodes of the second light diffusing element and to the alternate current power source. The one of the transparent electrodes of the second light diffusing element is connected to the other of the transparent electrodes of the first light diffusing element and to the alternate current power source, and the other of the transparent electrodes thereof is connected to the direct current power source for outputting the voltage of the value substantially equal to the maximum value of the output voltage of the alternate current power source.

Specifically, in the case where an alternate current voltage from 0 to V is applied from the alternate current power source to the other of the transparent electrodes of the first light diffusing element, and to the one of the transparent electrodes of the second light diffusing element, respectively, if the alternate current voltage is set to 0, the applied voltage to the first light diffusing element is set to 0, and the first light diffusing element is turned into a scattering state. Simultaneously, the applied voltage to the second light diffusing element is set to V, and the second light diffusing element is turned into a transparent state. On the other hand, if the alternate current voltage is set to V, the applied voltage to the first light diffusing element is set to V, and the first light diffusing element is turned into a transparent state. Simultaneously, the applied voltage to the second light diffusing element is set to 0, and the second light diffusing element is turned into a scattering state. This enables to alternately switch the two light diffusing elements between a scattering state and a transparent state with a simplified arrangement of applying an alternate current voltage to the two light diffusing elements.

In the projection display device, preferably, the plurality of the light diffusing elements may include (n) light diffusing elements each operable to change from a scattering state to a transparent state twice per cycle, and a phase difference of each of the light diffusing elements may be $1/(2n)$ cycle.

In the above arrangement, the phase differences of the (n) light diffusing elements each operable to change from a scattering state to a transparent state twice per cycle are respectively $1/(2n)$ cycle. Accordingly, for instance, in the case where two light diffusing elements are used, and one of the light diffusing elements is in a scattering state, the other of the light diffusing elements is in a transparent state. Since the angle of light for illuminating the pixels of the spatial light modulation element is changed at a high speed, speckle noise is changed at such a speed that the human eye cannot follow, and as a result, speckle noise can be reduced.

In the projection display device, preferably, each of the light diffusing elements may have a transparent film dispersedly containing a liquid crystal material, and two transparent electrodes for sandwiching the transparent film therebetween, and the two transparent electrodes of the each of the light diffusing elements may be connected to the alternate current power source.

In the above arrangement, each of the light diffusing elements has the transparent film dispersedly containing the liquid crystal material, and the two transparent electrodes for sandwiching the transparent film therebetween. The two transparent electrodes of the each of the light diffusing elements are connected to the alternate current power source. Thus, an alternate current voltage is applied to the light diffusing elements individually. This enables to switch the light diffusing elements between a scattering state and a transparent state individually, which is advantageous in changing the degree of diffusion more finely.

In the projection display device, preferably, the laser light source may include a red laser light source for emitting red laser light, a blue laser light source for emitting blue laser light, and a green laser light source for emitting green laser light, and the plurality of the light diffusing elements may be operable to change the degree of diffusion depending on wavelengths of the red laser light, the blue laser light, and the green laser light.

In the above arrangement, since the degree of diffusion is changed depending on the wavelengths of the red laser light, the blue laser light, and the green laser light, speckle noise can be optimally reduced with respect to each of the wavelengths of the laser light.

In the projection display device, preferably, the plurality of the light diffusing elements may be operable to maximize the degree of diffusion in the case where the green laser light emitted from the green laser light source is incident.

Considering spectral luminous efficiency, speckle noise in green laser light is liable to be detected, as compared with speckle noise in red laser light or blue laser light. In the above arrangement, the degree of diffusion is maximized when green laser light emitted from the green laser light source is incident. Accordingly, the degree of diffusion of green laser light can be set larger than the degrees of diffusion of blue laser light and red laser light. This is advantageous in reducing speckle noise in green laser light, and reducing loss in light use efficiency resulting from diffusion of blue laser light and red laser light.

In the projection display device, preferably, the plurality of the light diffusing elements may be operable to make the degrees of diffusion substantially identical to each other. In this arrangement, since the degrees of diffusion of laser light through the plurality of the light diffusing elements are made substantially identical to each other, the maximum values of the voltages to be applied to the plurality of the light diffusing elements can be made substantially identical to each other. This enables to simplify the arrangement of the projection display device.

In the projection display device, preferably, each of the light diffusing elements is divided into a plurality of regions, and is operable to change the degree of diffusion with respect to each of the regions temporally and electrically.

In the above arrangement, since the each of the light diffusing elements is divided into the plurality of regions, and is operable to change the degree of diffusion with respect to each of the regions temporally and electrically, the degree of diffusion of laser light can be spatially changed. This enables to make the light intensity distribution of laser light substantially uniform.

In the projection display device, preferably, the plurality of the regions may include a plurality of annular regions around the optical axis. In this arrangement, since the plurality of the regions include the plurality of annular regions around the optical axis, the degree of diffusion can be spatially changed depending on the cross sectional shape of laser beam. This enables to make the light intensity distribution of laser light substantially uniform.

In the projection display device, preferably, the plurality of the light diffusing elements may be opposed to each other on a plane perpendicular to an optical axis of a transparent common substrate. In this arrangement, since the plurality of the light diffusing elements are opposed to each other on the plane perpendicular to the optical axis of the transparent common substrate, the distance between the light diffusing elements can be predefined by the common substrate. This enables to eliminate the need of relative positioning of the light diffusing elements, and reduce the thickness of the projection display device in the optical axis direction.

Preferably, the projection display device may further include: a homogenizer, provided in proximity to one of the plurality of the light diffusing elements closest to the projection lens, for making a light amount distribution of the incident laser light substantially uniform, wherein the homogenizer satisfies the following formula:

$$L < A/(2\theta)$$

where L is a distance between the light diffusing element closest to the laser light source, and the light diffusing element closest to the projection lens, $\theta$ is a maximum diffusion angle of each of the light diffusing elements, and A is an aperture diameter of an incident surface of the homogenizer.

In the above arrangement, the homogenizer is provided in proximity to the one of the plurality of the light diffusing elements closest to the projection lens to make the light amount distribution of the incident laser light substantially uniform. The homogenizer satisfies the formula: $L < A/(2\theta)$ where L is the distance between the light diffusing element closest to the laser light source, and the light diffusing element closest to the projection lens, $\theta$ is the maximum diffusion angle of each of the light diffusing elements, and A is the aperture diameter of an incident surface of the homogenizer.

Accordingly, even if the light diffusing element closest to the laser light source diffuses the laser light at the maximum diffusion angle, all the laser light is allowed to be incident into the aperture of the homogenizer. This enables to eliminate loss in light amount, secure a maximum light diffusion effect, and maximally obtain an effect of removing speckle noise.

A speckle reduction element according to another aspect of the invention includes: a plurality of light diffusing elements arranged on an optical axis between a laser light source for emitting laser light, and a spatial light modulation element for modulating the laser light to be emitted from the laser light source; and a driver for applying a cyclically variable voltage to the plurality of the light diffusing elements to change a degree of diffusion of the laser light temporally and electrically.

In the above arrangement, the plurality of the light diffusing elements are arranged on the optical axis between the laser light source for emitting laser light, and the spatial light modulation element for modulating the laser light to be emitted from the laser light source. The driver is operable to apply the cyclically variable voltage to the plurality of the light diffusing elements to change the degree of diffusion of the laser light temporally and electrically.

In the above arrangement, unlike the conventional art, wherein an actuator is used to mechanically change the degree of diffusion, the degree of diffusion is electrically changed. This enables to miniaturize the projection display device, and enhance reliability of the device. Further, since the degree of diffusion of the laser light is temporally changed, speckle noise can be reduced.

The projection display device and the speckle reduction element of the invention enable to miniaturize the projection display device, enhance reliability of the device, and reduce speckle noise, and are useful as a projection display device using laser light, and a speckle noise reducing element for reducing speckle noise.

Also, the projection display device of the invention includes a laser optical system operable to reduce speckle noise, and is also useful as a front projector, a rear projector, or a like device. Further, the projection display device of the invention may be applied to a back panel or a like member of an illumination device or a liquid crystal display by utilizing solely an illumination optical system in the projection display device.

The invention claimed is:

1. A projection display device, comprising:
a laser light source;
a spatial light modulation element for modulating laser light to be emitted from the laser light source;
a projection lens for projecting the laser light modulated by the spatial light modulation element onto a screen; and
a plurality of light diffusing elements, arranged on an optical axis between the laser light source and the spatial light modulation element, for changing a degree of diffusion of the laser light temporally and electrically,
wherein the plurality of the light diffusing elements cyclically change the degree of diffusion respectively, the plurality of the light diffusing elements including two light diffusing elements, a first light diffusing element and a second light diffusing element,
each of the plurality of the light diffusing elements chnages from a scattering state to a transparent state once per cycle and each has a transparent film dispersedly containing a liquid crystal material and two transparent electrodes for sandwiching the transparent film therebetween,
one of the transparent electrodes of the first light diffusing element is grounded and another of the transparent electrodes thereof is connected to one of the transparent electrodes of the second light diffusing element and to an alternate current power source,
the one of the transparent electrodes of the second light diffusing element is connected to the other of the transparent electrodes of the first light diffusing element and to the alternate current power source, and another of the transparent electrodes thereof is connected to a direct current power source for outputting a voltage of a value substantially equal to a maximum value of an output voltage of the alternate current power source, and
a phase of the cyclic change in the degree of diffusion is shifted with respect to each of the light diffusing elements, and a phase difference between the two light diffusing elements is a one-half cycle.

2. The projection display device according to claim 1, wherein the plurality of the light diffusing elements are arranged on a converging optical path.

3. The projection display device according to claim 1, wherein
the laser light source includes a red laser light source for emitting red laser light, a blue laser light source for emitting blue laser light, and a green laser light source for emitting green laser light, and
the plurality of the light diffusing elements change the degree of diffusion depending on wavelengths of the red laser light, the blue laser light, and the green laser light.

4. The projection display device according to claim 3, wherein
the plurality of the light diffusing elements maximize the degree of diffusion in the case where the green laser light emitted from the green laser light source is incident.

5. The projection display device according to claim 1, wherein
the plurality of the light diffusing elements make degrees of diffusion substantially identical to each other.

6. The projection display device according to claim 1, wherein
the plurality of the light diffusing elements are opposed to each other on a plane perpendicular to an optical axis of a transparent common substrate.

7. A projection display device comprising:
a laser light source;
a spatial light modulation element for modulating laser light to be emitted from the laser light source;
a projection lens for projecting the laser light modulated by the spatial light modulation element onto a screen; and
a plurality of light diffusing elements, arranged on an optical axis between the laser light source and the spatial light modulation element, for changing a degree of diffusion of the laser light temporary and electrically,
wherein the plurality of the light diffusing elements cyclically change the degree of diffusion, respectively,
a phase of the cyclic change in the degree of diffusion is shifted with respect to each of the light diffusing elements,
the plurality of the light diffusing elements include (n) light diffusing elements each changing from a scattering state to a transparent state twice per cycle, and
a phase difference of each of the light diffusing elements is 1/(2n) cycle.

8. The projection display device according to claim 7, wherein
each of the light diffusing elements has a transparent film dispersedly containing a liquid crystal material, and two transparent electrodes for sandwiching the transparent film therebetween, and
the two transparent electrodes of the each of the light diffusing elements are connected to an alternate current power source.

9. A projection display device comprising:
a laser light source;
a spatial light modulation element for modulating laer light to be emitted from the laser light source;
a projection lens for projecting the laser light modulated by the spatial light modulation element onto a screen; and
a plurality of light diffusing elements, arranged on an optical axis between the laser light source and the spatial light modulation for changing a degree of diffusion of the light temporally and electrically,
wherein each of the light diffusing elements is divided into a plurality of regions, and changes the degree of diffusion with respect to each of the regions temporally and electrically.

10. The projection display device according to claim 9, wherein
the plurality of the regions include a plurality of annular regions around the optical axis.

11. A projection display device comprising:
a laser light source;
a spatial light modulation element for modulating laser light to be emitted from the laser light source;
a projection lens for projecting the laser light modulated by the spatial light modulation element onto a screen; and
a plurality of light diffusing elements, arranged on an optical axis between the laser light source and the spatial light modulation element, for changing a degree of diffusion of the laser light temporally and electrically;
a homogenizer, provided in proximity to one of the plurality of the light diffusing elements closest to the projection lens, for making a light amount distribution of the incident laser light substantially uniform, wherein the homogenizer satisfies the following formula:

$$L < A/(2\theta)$$

where L is a distance between the light diffusing element closest to the laser light source, and the light diffusing element closest to the projection lens, θ is a maximum diffusion angle of each of the light diffusing elements, and A is an aperture diameter of an incident surface of the homogenizer.

12. A speckle reduction element, comprising:

a plurality of light diffusing elements arranged on an optical axis between a laser light source for emitting laser light, and a spatial light modulation element for modulating the laser light to be emitted from the laser light source; and a driver for applying a cyclically variable voltage to the plurality of the light diffusing elements to change a degree of diffusion of the laser light temporally and electrically, wherein the plurality of the light diffusing elements cyclically change the degree of diffusion respectively, the plurality of the light diffusing including two light diffusing elements, a first light diffusing element and a second light diffusing element, each of the plurality of light diffusing elements changes from a scattering state to a transparent state once per cycle and each has a transparent film dispersedly containing a liquid crystal material and two transparent electrodes for sandwiching the transparent film therebetween, one of the transparent electrodes of the first light diffusing element is grounded and another of the transparent electrodes thereof is connected to one of the transparent electrodes of the second light diffusing element and to an alternate current power source, the one of the transparent electrodes of the second light diffusing element is connected to the other of the transparent electrodes of the first light diffusing element and to the alternate current power source, and another of the transparent electrodes thereof is connected to a direct current power source for outputting a voltage of a value substantially equal to a maximum value of an output voltage of the alternate current power source, and a phase of the cyclic change in the degree of diffusion is shifted with respect to each of the light diffusing elements, and a phase difference between the two light diffusing elements is a one-half cycle.

13. A speckle reduction elements, comprising:

a plurality of light diffusing elements arranged on an optical axis between a laser light source for emitting laser light, and a spatial light modulation element for modulating the laser light to be emitted from the laser light source; and a driver for applying a cyclically variable voltage to the plurality of the light diffusing elements to change a degree of diffusion of the laser light temporally and electrically, wherein the plurality of the light diffusing elements cyclically change the degree of diffusion, respectively, a phase of the cyclic change in the degree of diffusion is shifted with respect to each of the light diffusing elements, the plurality of the light diffusing elements include (n) light diffusing elements that each change from a scattering state to a transparent state twice per cycle, and a phase difference of each of the light diffusing elements in 1/(2n) cycle.

14. A speckle reduction elements, comprising:

a plurality of light diffusing elements arranged on an optical axis between a laser light source for emitting laser light, and a spatial light modulation element for modulating the laser light to be emitted from the laser light source; and a driver for applying a cyclically variable voltage to the plurality of the light diffusing elements to change a degree of diffusion of the laser light temporally and electrically, wherein each of the light diffusing elements is divided into a plurality of regions, and each change the degree of diffusion with respect to each of the regions temporally and electrically.

* * * * *